(12) United States Patent
Subat (10) Patent No.: US 9,440,566 B2
(45) Date of Patent: Sep. 13, 2016

(54) LIGHTWEIGHT ACOUSTIC ENCLOSURES

(71) Applicant: Bose Corporation, Framingham, MA (US)

(72) Inventor: Bradford Kyle Subat, Worcester, MA (US)

(73) Assignee: Bose Corporation, Framingham, MA (US)

( * ) Notice: Subject to any disclaimer, the term of this patent is extended or adjusted under 35 U.S.C. 154(b) by 34 days.

(21) Appl. No.: 14/562,240

(22) Filed: Dec. 5, 2014

(65) Prior Publication Data

US 2016/0159260 A1   Jun. 9, 2016

(51) Int. Cl.
| | |
|---|---|
| H04R 1/02 | (2006.01) |
| B60N 2/48 | (2006.01) |
| B29C 44/12 | (2006.01) |
| H04R 5/02 | (2006.01) |
| B29K 25/00 | (2006.01) |
| B29K 105/04 | (2006.01) |
| B29L 31/30 | (2006.01) |

(52) U.S. Cl.
CPC ............. *B60N 2/4876* (2013.01); *B29C 44/12* (2013.01); *H04R 1/026* (2013.01); *H04R 5/023* (2013.01); *B29K 2025/06* (2013.01); *B29K 2105/04* (2013.01); *B29L 2031/3023* (2013.01); *H04R 2499/13* (2013.01)

(58) Field of Classification Search
CPC ............................ B60N 2/4876; H04R 1/02
USPC .................. 381/386, 86, 389; 181/141, 150; 297/217.4
See application file for complete search history.

(56) References Cited

U.S. PATENT DOCUMENTS

| | | | | |
|---|---|---|---|---|
| 3,512,605 | A * | 5/1970 | McCorkle | B60N 2/4876 181/141 |
| 4,027,112 | A * | 5/1977 | Heppner | A47C 7/38 381/104 |
| 4,638,884 | A * | 1/1987 | Lee | H04R 5/023 181/141 |
| 5,887,071 | A * | 3/1999 | House | H04R 5/02 381/332 |
| 6,975,737 | B2 * | 12/2005 | Hirao | H04R 5/023 297/217.4 |
| 7,162,048 | B2 * | 1/2007 | Shima | H04R 1/025 381/334 |
| 8,130,987 | B2 * | 3/2012 | Kaneda | H04R 1/26 381/301 |
| 8,199,940 | B2 * | 6/2012 | Yokota | H04R 5/04 381/1 |

(Continued)

FOREIGN PATENT DOCUMENTS

EP   2 058 169   5/2009

OTHER PUBLICATIONS

U.S. Appl. No. 14/154,924, filed Jan. 14, 2014, Charles Oswald, et al.

(Continued)

*Primary Examiner* — William Deane, Jr.
(74) *Attorney, Agent, or Firm* — Fish & Richardson P.C.

(57) ABSTRACT

The technology described in this document can be embodied in an acoustic enclosure for a speaker system disposed in a portion of a vehicle seat. The acoustic enclosure includes a rigid plate configured to be attached to a frame, a first section, and a second section. The rigid plate configured to support a speaker disposed in part within the acoustic enclosure. The first section is constructed from expanded resin, and disposed in contact with the rigid plate. The second section is disposed in contact with the first section, between the second section and the rigid plate. The first and second section together define a housing of the acoustic enclosure that includes at least one cavity configured to accommodate a portion of the speaker.

30 Claims, 9 Drawing Sheets

(56) References Cited

U.S. PATENT DOCUMENTS

| | | | |
|---|---|---|---|
| 2010/0148550 A1* | 6/2010 | Kidd | B60N 2/4876 297/217.4 |
| 2014/0183321 A1 | 7/2014 | Tsai | |
| 2014/0270322 A1 | 9/2014 | Silverstein | |
| 2014/0355783 A1 | 12/2014 | Subat | |
| 2016/0039320 A1* | 2/2016 | Subat | B60N 2/4876 297/217.5 |

OTHER PUBLICATIONS

International Search Report and Written Opinion; PCT/US2015/062309; Feb. 12, 2016; 11 pp.

* cited by examiner

PRIOR ART

FIG. 1A

PRIOR ART

FIG. 7A

LIGHTWEIGHT ACOUSTIC ENCLOSURES

TECHNICAL FIELD

This disclosure generally relates to lightweight acoustic enclosures, and more particularly, to lightweight acoustic enclosures incorporated in headrests.

BACKGROUND

Figure 1A:
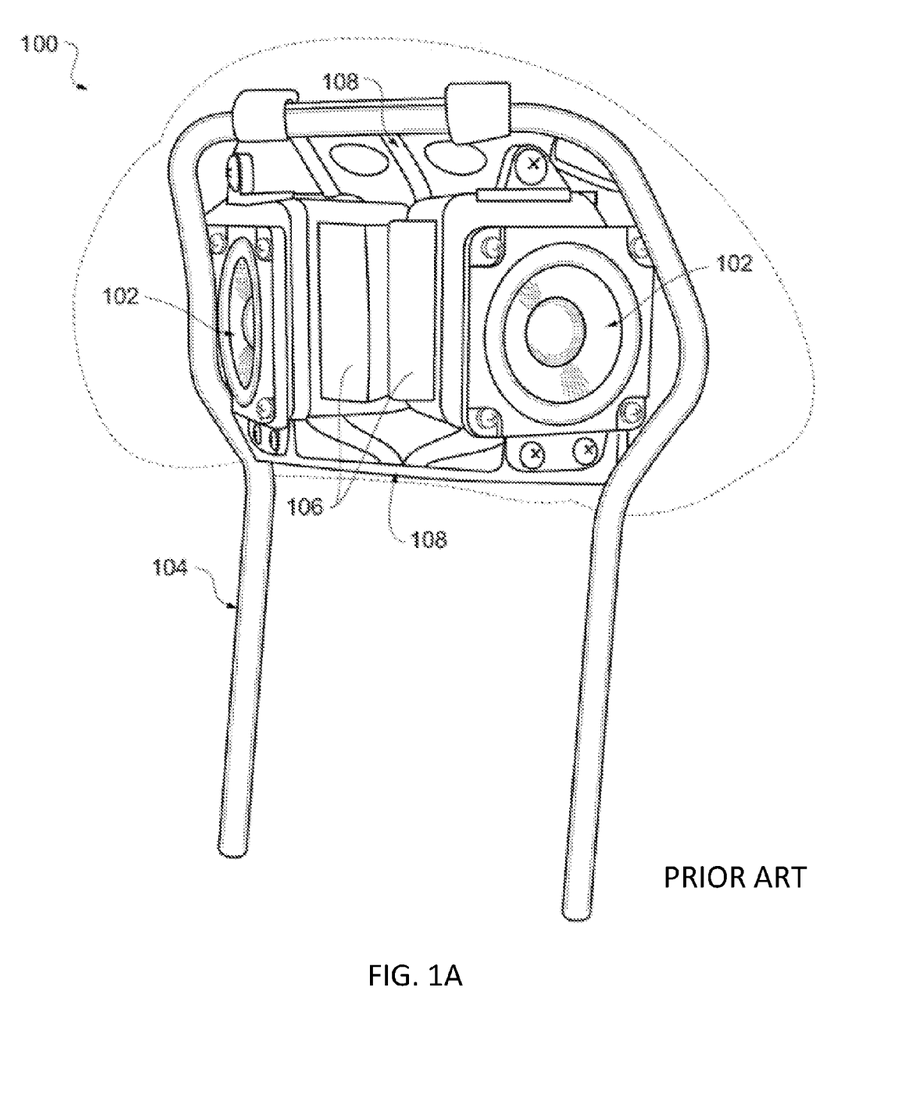
FIGS. 1A and 1B show perspective views of an inner portion of a headrest that includes speakers.
Figure 1B:
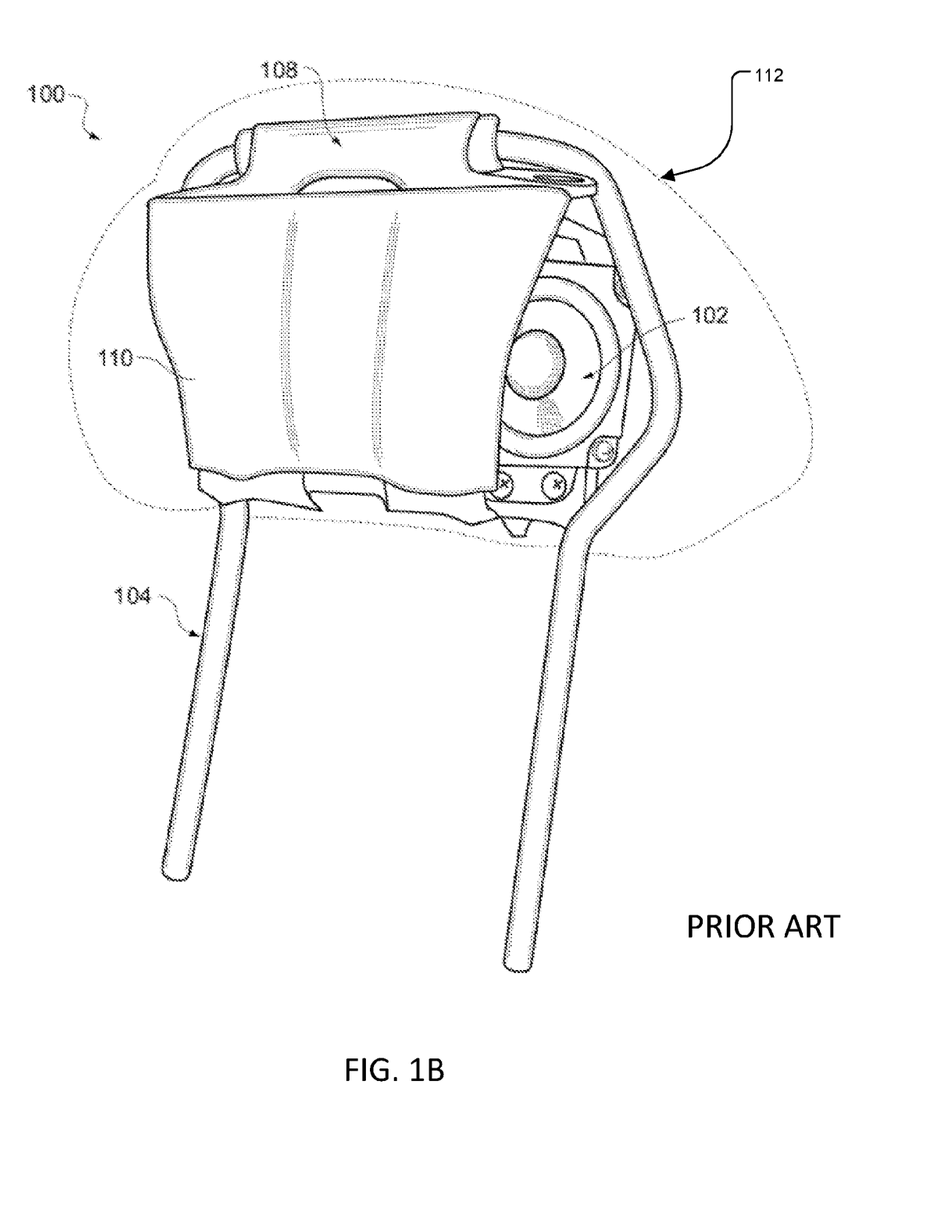

Headrests used in vehicle seats can include speakers to deliver a near-field acoustic experience. FIGS. 1A and 1B illustrate an example of such a headrest 100 that incorporates speakers 102. Referring to FIG. 1A, the speakers 102 are attached, either directly or via another rigid structure, to a U-shaped frame 104 and are positioned such that the speakers 102 are directly behind the user's head (i.e., as opposed to the being located on the left and right sides of the U-shaped frame 104) and to fire outwardly, in diverging directions on either side of the headrest 100.

In some cases, each speaker 102 is disposed in an acoustic enclosure 106. Each of those sub-assemblies then gets screwed into a two-piece sheet metal cage 108 which is secured to the U-shaped frame 104. FIG. 1A shows a partial assembly with a front portion of the sheet metal cage 108 removed to view the speakers 102 and enclosures 106. FIG. 1B shows the sheet metal cage 108 fully assembled with the front portion 110 in place.

SUMMARY

In one aspect, this document describes an acoustic enclosure for a speaker system disposed in a portion of a vehicle seat. The acoustic enclosure includes a rigid plate configured to be attached to a frame, a first section, and a second section. The rigid plate is configured to support a speaker disposed in part within the acoustic enclosure. The first section is constructed from expanded resin, and disposed in contact with the rigid plate. For example, the first section includes expanded resin over-molded on the rigid plate. The second section is coupled to the first section. For example, the second section is disposed in contact with the first section, which is between the second section and the rigid plate. The first and second section together define a housing of the acoustic enclosure that includes at least one cavity configured to accommodate a portion of the speaker.

In another aspect, the document describes a seat headrest that includes a frame configured to attach the headrest to a seat, and an acoustic enclosure for a speaker. The acoustic enclosure includes a rigid plate attached to the frame, the rigid plate configured to support a speaker disposed in part within the acoustic enclosure, a first section, and a second section. The first section is constructed of a material comprising expanded resin, and disposed in contact with the rigid plate. For example, the first section includes an expanded resin that is over-molded on the rigid plate. The second section is coupled to the first section. For example, the second section is disposed in contact with the first section, such that the first and second section together define a housing of the acoustic enclosure that includes at least one cavity configured to accommodate a portion of the speaker. The headrest also includes a rigid supporting structure disposed in contact with the rigid plate.

In another aspect, this document describes a method of constructing an acoustic enclosure for a speaker system disposed in a portion of a vehicle seat. The method includes producing a first section of the acoustic enclosure by molding expanded resin over a rigid plate. The method also includes producing a second section of the acoustic enclosure, wherein the second section comprises one or more surfaces that are configured to be attached to corresponding one or more surfaces of the first section. The method further includes coupling the second section to the first section such that the first section and the second section together form at least one cavity of the acoustic enclosure. The at least one cavity is configured to accept at least a portion of the speaker system.

Implementations of the above aspects can include one or more of the following. The second section can be constructed of expanded resin. The expanded resin can include expanded polystyrene foam. The rigid plate can be welded or fastened to frame. The first section can be over-molded on the rigid plate. The rigid plate can be constructed from, for example, sheet metal or injection-molded plastic. The second section can be mechanically attached to the first section. The second section can be welded to the first section.

The seat headrest can include a covering layer disposed over an external surface of the rigid supporting structure such as an impact plate. The covering layer can include at least one of: soft foam, fabric, leather, suede, or artificial leather. The second section can be constructed of a material comprising expanded resin. The rigid supporting structure can include an acoustic channel that facilitates acoustic energy to be radiated out of the acoustic enclosure. The rigid supporting structure can be constructed of expanded resin. The first section and the rigid supporting structure can be disposed on opposite sides of at least a portion of the rigid plate.

The second section can be produced by molding expanded resin. The second section can be produced by molding a plastic. The rigid plate can be attached to a rigid frame associated with the acoustic enclosure. The expanded resin can be molded over the rigid plate such that the rigid plate is enclosed in part by the expanded resin.

The rigid plate can include one or more structural features for configuring a flexibility of the rigid plate. The one or more structural features can be created by, for example, removing a portion of the rigid plate to increase flexibility of the rigid plate. The one or more structural features can include a flange configured to provide additional stiffness to the rigid plate.

Various implementations described herein may provide one or more of the following advantages. By providing an acoustic enclosure constructed from rigid lightweight material such as expanded resin, the overall weight of the headrest can be significantly reduced without compromising on structural integrity of the acoustic enclosure. Using a low cost material such as expanded resin can also reduce the overall cost for the acoustic-headrests.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Vehicle seats can be fitted with acoustic transducers or speakers for delivering a near-field acoustic experience. For example, a speaker system can be fitted into a seat such that the speakers are proximate to the ears of an occupant of the seat, to provide an immersive acoustic experience. The speakers can be disposed, for example, in an acoustic enclosure within a headrest of the seat, or in a portion of the seat near the occupant's neck or shoulders. When multiple speakers are used, the speakers may also be distributed in various parts of the seat, for example, to provide an immersive acoustic effect. This document primarily uses examples of seat headrests to illustrate the technology. However, the technology is also applicable to acoustic enclosures for speakers disposed in other portions of a seat. In addition, while the examples below refer to vehicle seats, the technology is also applicable for other types of acoustically enabled seats or furniture that may have speakers installed in the manner described herein. For example, the technology can be used in massage chairs, sofas, recliners, tables, or beds fitted with speakers.

In some implementations, using a lightweight rigid material (rather than metal or injection molded plastic) for the acoustic enclosure can help in reducing the weight of the acoustic enclosure, and by extension, the weight of the headrest within which the acoustic enclosure is disposed. In some cases, such a lightweight headrest can be beneficial, for example, from a safety standpoint. For example, using a lightweight headrest in a vehicle seat may contribute to increased safety for the occupants of the vehicle in the event of an accident. Using a lightweight rigid material such as expanded resin can also reduce one or more of material costs and manufacturing costs associated with the headrests.

Figure 2A:
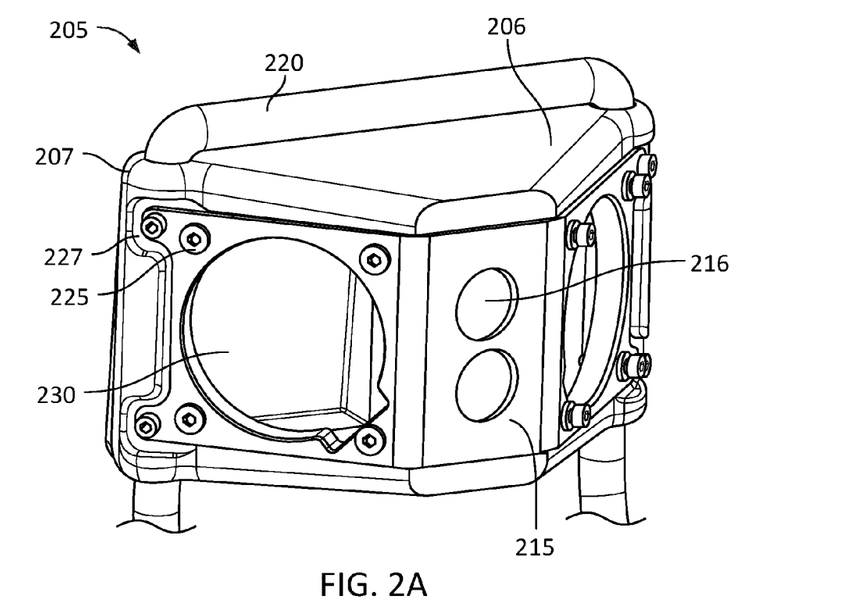
FIGS. 2A-2C show examples of acoustic enclosures.
Figure 2B:
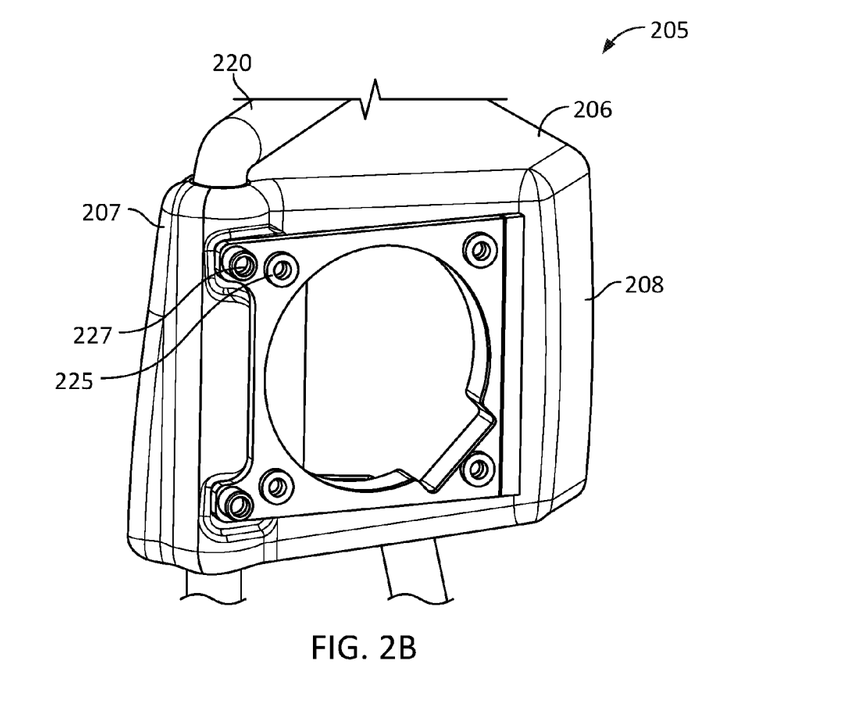

FIGS. 2A and 2B show examples of lightweight acoustic enclosures 205 that can be used in vehicle headrests. Referring to FIG. 2A, the acoustic enclosure 205 can be attached to a rigid frame 220 that provides mechanical support to the acoustic enclosure. The frame 220 can also be configured to couple the headrest within which the acoustic enclosure 205 is disposed to a vehicle seat. Because the acoustic enclosure 205 is lightweight, a lightweight frame can be used without compromising on mechanical stability of the headrest. For example, a U-shaped frame 220, e.g., consisting of a single U-shaped bar, may be used for supporting the acoustic enclosure 205 and the corresponding headrest. In some implementations, high strength safety steel can be used in constructing the frame 220. The frame 220 can have a hollow tubular cross-section. The wall-thickness of the tube can be adjusted based on a strength requirement of the frame 220. For example, the wall thickness for supporting a lightweight headrest can be less than the wall-thickness required for supporting a relatively heavier headrest. Therefore, by providing a light-weight headrest, the wall thickness of the frame 220 can be reduced, thereby facilitating use of cheaper and lighter frames. In some implementations, the frame 220 can include two separate short pieces to make the frame cheaper and lighter.

The acoustic enclosure 205 can include a rigid plate 215 to which the speakers are mounted. In some implementations, the rigid plate 215 can be attached to the frame 220. The rigid plate can be constructed from, for example, sheet metal, injection-molded plastic, or another rigid material that can be configured to provide mechanical support to the one or more speakers mounted on the plate 215. The rigid plate 215 can be attached to the frame 220 in various ways. For example, if both the frame 220 and the rigid plate 215 are made of metal, the rigid plate 215 can be welded to the frame 220. In another example, where the rigid plate 215 is constructed from injection-molded plastic, the plate 215 can be attached to the frame 220, for example, via fasteners such as screws, or over-molded eliminating the need for fasteners.

The rigid plate 215 can be configured to include one or more receptacles 225. In some implementations, the receptacles 225 can be in communication with a cavity 230 of the acoustic enclosure 205. In such cases, the fasteners inserted into the receptacles 225 may be configured to provide a sealing configuration. In some implementations, the other end of the receptacles 225 may be closed or sealed. The receptacles 225 can be used, for example, as fastener receptacles such as screw bosses configured to receive fasteners (e.g. mounting screws) for mounting speakers to the acoustic enclosure 205. The rigid plate 215 can also include one or more openings 227 that may be used as fastener receptacles for attaching the rigid plate 215 to the frame 220.

In the example of FIG. 2A, a single rigid plate 215 is used for providing support to multiple speakers. Specifically, the rigid plate 215 is configured to define an exterior surface that supports multiple speakers. In some implementations, multiple rigid plates may also be used. An example of such an implementation is shown in FIG. 2B, where a single rigid plate is used as a support for one of the speakers mounted to the acoustic enclosure 205. A separate rigid plate (not shown) can be used to support another speaker mounted to the acoustic enclosure 205.

Figure 2C:
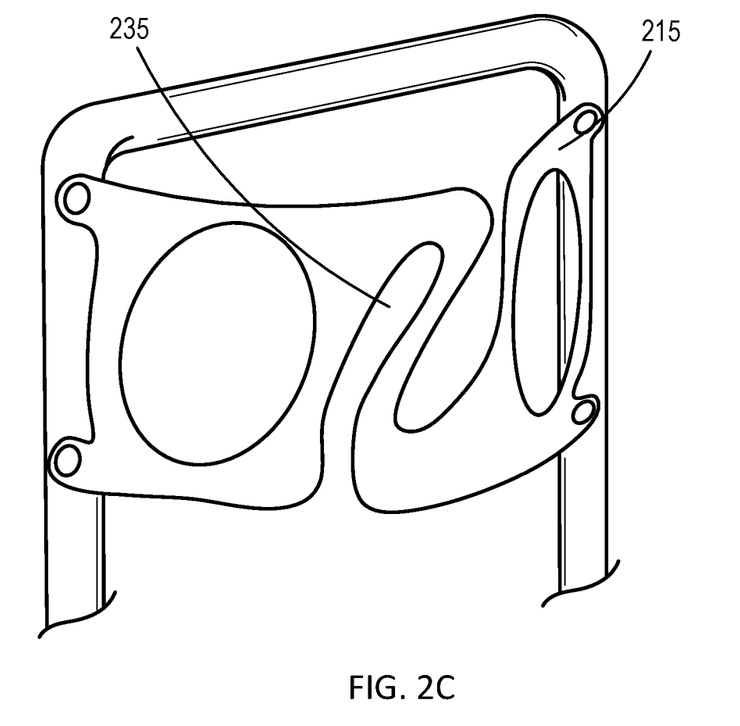

In some implementations, the rigid plate 215 can be configured to include structural features in accordance with a desired flexibility. For example, the rigid plate 215 can include a flange bent towards the inside (i.e., towards the acoustic enclosure) to provide additional stiffness. Alternatively or additionally, the rigid plate 215 can include one or more cut-outs 235 to provide flexibility to the plate 215, as shown in FIG. 2C.

In some implementations, each of the rigid plate can be configured to include one or more receptacles 225. In some implementations, the receptacles 225 can be in communication with the cavity 230 of the acoustic enclosure 205. In such cases, the fasteners inserted into the receptacles 225 may be configured to provide a sealing configuration. In some implementations, the other end of the receptacles 225 may be closed or sealed. The receptacles 225 can be used, for example, as fastener receptacles such as screw bosses configured to receive fasteners (e.g. mounting screws) for mounting speakers to the acoustic enclosure 205. Each rigid plate can also include one or more openings 227 that may be used as fastener receptacles for attaching the corresponding rigid plate to the frame 220.

The acoustic enclosure 205 can be made lightweight, for example, by constructing at least a portion of the acoustic enclosure from rigid but lightweight material such as expanded (or injection-molded) resin. Other lightweight rigid material that may be used for constructing the acoustic enclosures include, for example, thermoplastic material such as polystyrene, polypropylene, polyethylene, and acrylonitrile butadiene styrene (ABS). In some implementations, rigid, closed-cell resin foam such as expanded polystyrene (EPS) may be used in constructing at least a portion of the acoustic enclosure 205. Expanded foam materials such as EPS may be desirable due to various beneficial properties. For example, EPS is lightweight, and can provide acoustic isolation. EPS can be molded into various shapes in accordance with the requirements of the acoustic enclosures. The acoustic isolation afforded by EPS can be beneficial, for example, in achieving acoustic isolation of multiple speakers mounted to the acoustic enclosures.

In some implementations, the acoustic enclosure 205 can include multiple sections. In some implementations, the acoustic enclosure 205 includes a first section 206 that is disposed in contact with the rigid plate 215. In some implementations, the first section, which is constructed from a lightweight rigid material such as expanded resin, is over-molded on to the rigid plate 215. For example, an assembly including the frame 220 and the rigid plate 215 can be loaded into a molding apparatus that molds the expanded resin (or another rigid lightweight material) on to the assembly.

Figure 3:
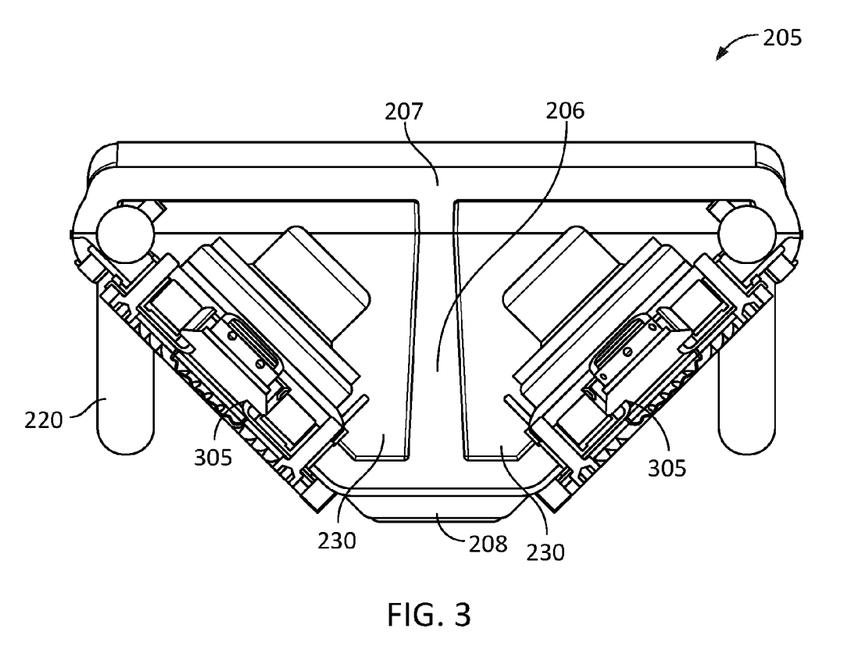
FIG. 3 shows a top cross-section view of an acoustic enclosure.
Figure 4:
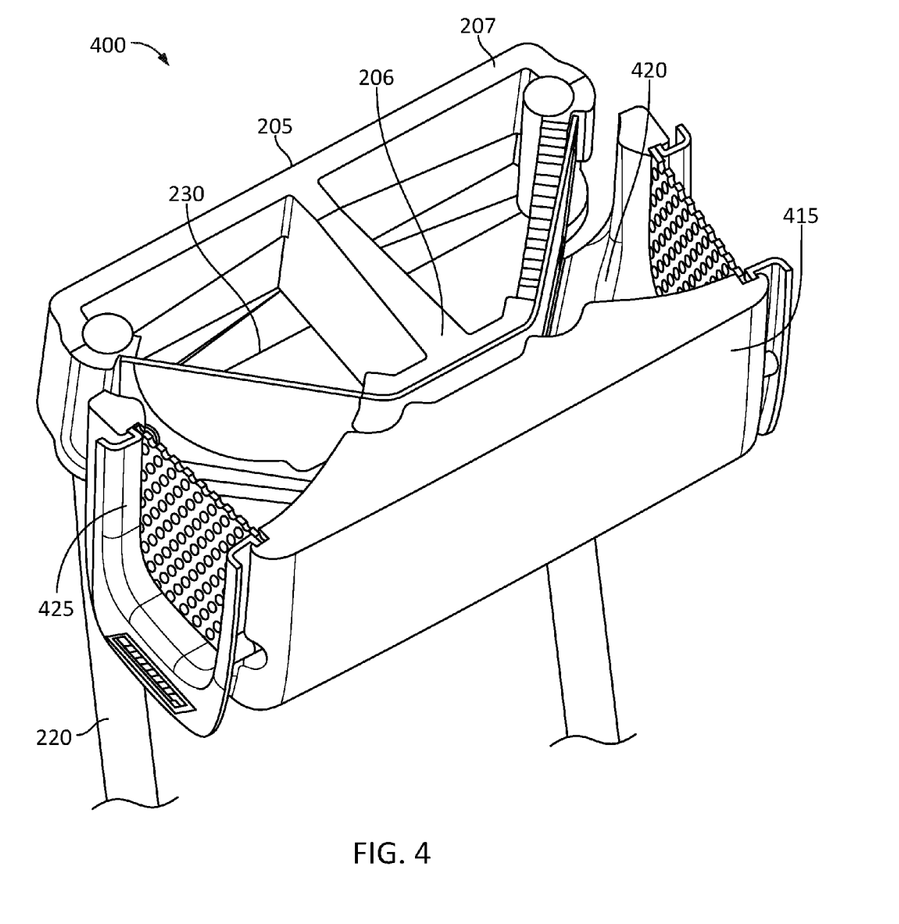
FIG. 4 shows a perspective view of a cross-section of a headrest.

The acoustic enclosure 205 can also include a second section 207. The second section 207 can be molded separately and mechanically attached to the first section 206 such that the first and second sections together define one or more cavities 230 of the acoustic enclosure 205. This is illustrated in FIGS. 3 and 4, which show a top view of a cross-section of an acoustic enclosure 205, and a perspective cross-section view of a corresponding headrest, respectively. As shown in FIG. 3, the shape of the first section 206 and the second section 207 is configured such that a cavity 230 accommodates at least a portion of a speaker 305. In some implementations, the second section 207 can be constructed from the same material used for the first section 206. For example, both the first and second sections may be constructed from expanded resin or another rigid lightweight material. In some implementations, the second section 207 may be constructed using a material different from the material used for the first section 206. For example, the first section 206 may be constructed from expanded resin and the second section 207 may be constructed from injection-molded plastic, or vice versa.

In some implementations, the material for the second section 207 may be chosen based on design goals. For example, a design choice between expanded resin and injection-molded plastic may be made based on a trade-off between weight and wall thickness. In one particular example, constructing an acoustic enclosure using expanded resin only can result in about 50% reduction in weight as compared to a similar acoustic enclosure constructed from injection-molded plastic. Using injection-molded plastic for at least a portion of the acoustic enclosure 205, on the other hand, can provide the advantage of having thinner walls (e.g., approximately 1.5 mm thick) as compared to walls of expanded resin (e.g., approximately 8 mm thick).

The first section 206 includes one or more surfaces that attach with corresponding surfaces in the second section 207 to form the one or more cavities 230. The first and second sections can be attached to one another, for example, using an adhesive. In some implementations, the second section 207 may be attached to the first section by other attachment techniques including, for example, a snap-lock mechanism or fasteners.

The housing can include an external covering layer such as soft foam, fabric, suede, leather, or artificial leather. In some implementations, the first section 206 can be over-molded on the rigid plate such that the first section 206 includes a portion 208 disposed in contact with at least a portion of the opposite side of the rigid plate 315. This is illustrated both in FIG. 2B and FIG. 3. For example, if there are one or more openings 216 on the rigid plate 215, or if there is a gap between two separate rigid plates used for the two speakers, the gap or opening can be covered using the portion 208. In some implementations, over-molding the first section on both sides of the rigid plate can allow for increased flexibility in design choices in manufacturing the acoustic enclosures and headrests.

In some implementations, the acoustic enclosure 205 can be disposed within a headrest of a seat such as a vehicle seat. FIG. 4 shows a perspective cross-section view of such a headrest 400. In some implementations, a housing of such a headrest includes a rigid portion or rigid support 415 disposed between a front wall of the headrest 400 and the acoustic enclosure 205. In some implementations, the rigid support 415 can also be constructed from a lightweight rigid material such as expanded resin, EPS foam, or another material as described above with reference to the acoustic enclosure 205. In some implementations, the rigid support 415 can be constructed from substantially the same material used in the first section 206 and/or the second section 207 of the acoustic enclosure 205. The rigid support 415 can be configured to serve various purposes such as providing mechanical and structural stability to the headrest 400, providing a buffering member between the front wall of the headrest housing and the acoustic enclosure 205, and providing additional acoustic isolation between the speakers within the headrest 400.

In some implementations, the rigid support 415 can include an acoustic channel 420 disposed between a speaker and the corresponding opening in the external surface of the headrest 400. The acoustic channels can be configured for controlling a radiation pattern of the acoustic energy radiated from the speakers located within the headrest 400. In some implementations, the acoustic channels are configured to create a radiation pattern that increases the efficiency from left speaker to left ear and right speaker to right ear as compared to the left speaker to right ear and right speaker to left ear, respectively.

In some implementations, the rigid support 415 can be configured to be acoustically absorptive (or acoustically opaque) to inhibit acoustic energy from passing through. This can cause substantially all (e.g., at least 90%) of the acoustic energy that reaches a user to pass through the acoustic channels 420.

Figure 5:
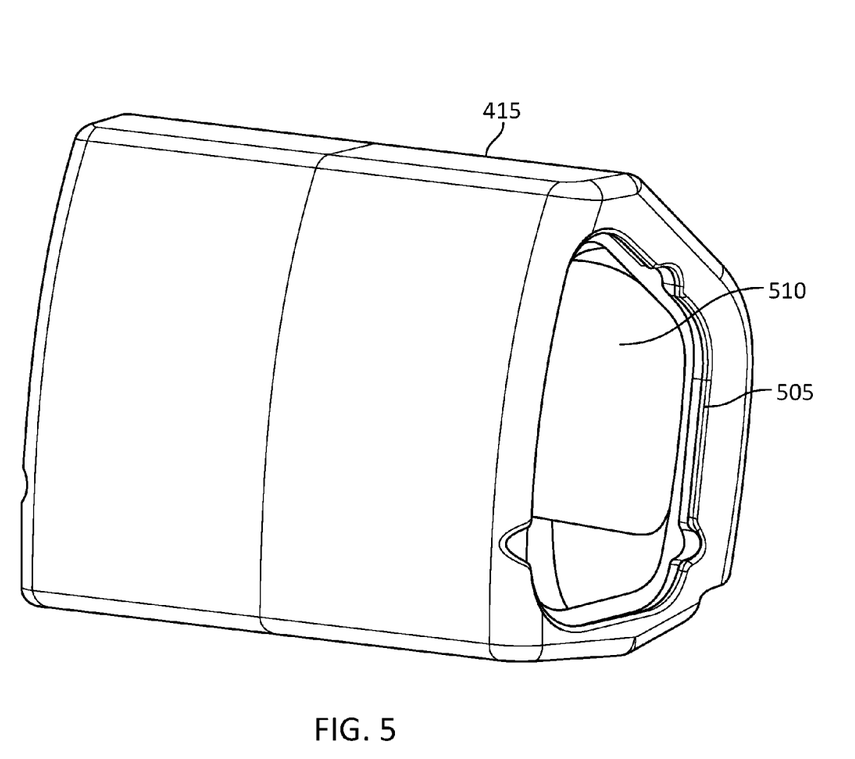
FIG. 5 shows an example of a rigid support in a headrest.

In some implementations, a speaker grill 425 can be disposed over the external opening of the headrest 400. In some implementations, the speaker grill 425 can be configured to be attached to a portion of the rigid support 415. As shown in FIG. 5, the rigid support 415 can be configured to include one or more structural features that allows a grill 425 to be attached to the rigid support 415. For example, a channel or recess 505 can be disposed around the periphery of an opening 510 of the rigid support 415 over which a speaker grill 425 is attached.

Figure 6:
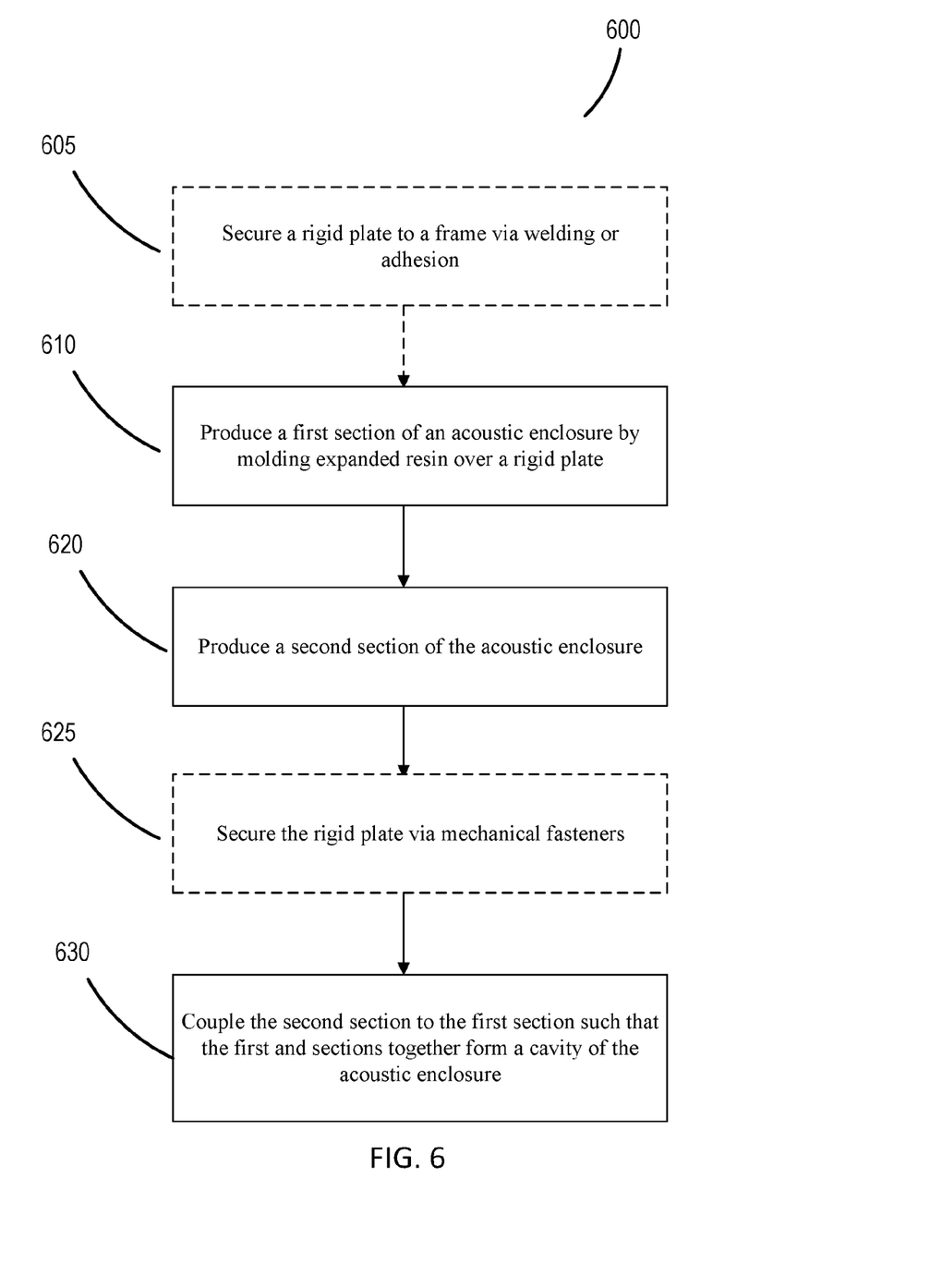
FIG. 6 shows a flowchart of an example process for producing the acoustic enclosure of FIG. 3.

FIG. 6 shows a flowchart of an example process 600 used in producing lightweight acoustic enclosures described in this application. Operations of the process 600 can include producing a first section of an acoustic enclosure by molding expanded resin over a rigid plate (610). The rigid plate can be constructed from, for example, sheet metal or rigid injection-molded plastic. In some implementations, the first section is produced by over-molding expanded resin on the rigid plate such that the rigid plate is enclosed, at least in part, by the expanded resin. The rigid plate can be configured to be attached to a rigid frame associated with the acoustic enclosure. In some implementations, the first section can be substantially similar to the first section 206 described above with reference to FIGS. 2A and 2B.

The operations of the process 600 can also include producing a second section of the acoustic enclosure (620). The second section can include one or more surfaces that are configured to be attached to one or more corresponding surfaces of the first section. In some implementations, the second section can be produced by molding expanded resin. In some implementations, the second section can be produced by molding a plastic, for example, via an injection-molding process. In some implementations, the second section can be substantially similar to the second section 207 described above with reference to FIGS. 2A and 2B.

The operations of the process 600 can also include coupling the second section to the first section such that the first and second sections together form a cavity of the acoustic enclosure (630). This can be done, for example, by attaching portions of the second section to corresponding portions of the first section. The cavity is configured to accept at least a portion of a speaker system disposed in the acoustic enclosure. In some implementations, the acoustic enclosure formed by the first and second sections are substantially similar to the acoustic enclosure 205 described above.

In some implementations, the rigid plate can be secured to a frame (605) e.g., via welding or adhesive, before the first section is produced. In some cases, producing the first section (610) can include over-molding expanded resin on the frame and the rigid plate. Alternatively, the rigid plate may be secured to the frame (625), e.g., via mechanical fasteners, after the first section is over-molded on the rigid plate.

Other Implementations

Figure 7A:
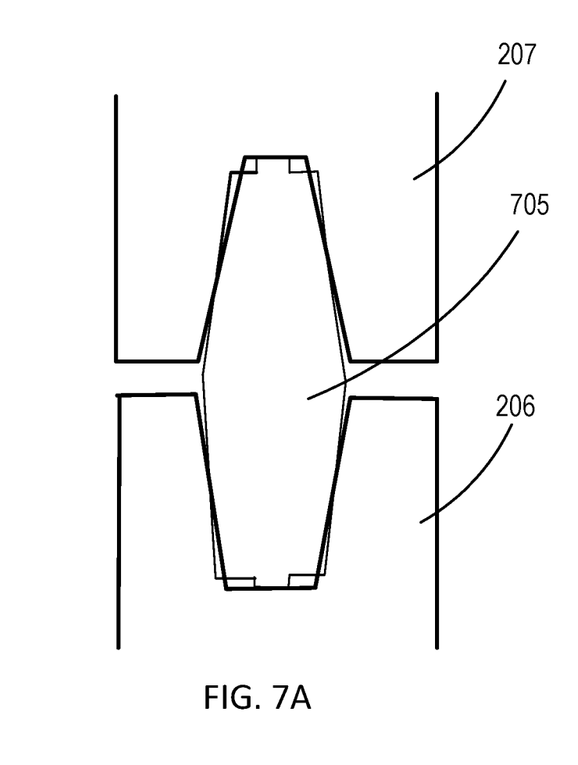
FIGS. 7A and 7B show examples of mechanical attachment techniques that can be used for coupling two sections of the acoustic enclosure of FIG. 3.
Figure 7B:
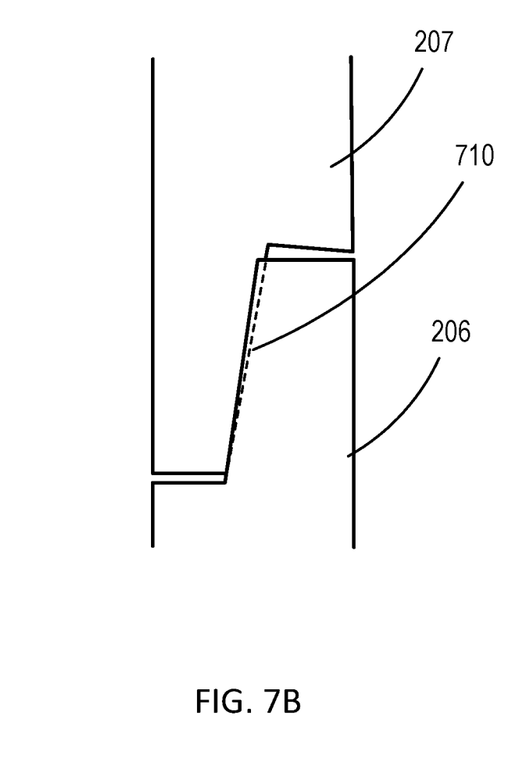

Although a few implementations have been described in detail above, other modifications are possible. For example, while an implementation has been described in which the first and second sections of the acoustic enclosure may alternatively or additionally be coupled using other mechanical attachment techniques. Such alternative mechanical attachment techniques are shown in FIGS. 7A and 7B. As shown in the example of FIG. 7A, the two sections 206 and 207 may be attached via interference fits to an injection molded ring or ridge 705. In the example of FIG. 7B, the two sections 206 and 207 may be attached using an overlapping joint 710 or a tongue-in-groove joint formed from portions of the first and second sections. In some implementations, the acoustic enclosure 205 is disposed within a housing of a headrest such that the second section 207 is in contact with the housing.

A number of implementations have been described. However, other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An acoustic enclosure for a speaker system disposed in a portion of a vehicle seat, the acoustic enclosure comprising:
    a rigid plate configured to be attached to a frame, the rigid plate configured to support a speaker disposed in part within the acoustic enclosure;
    a first section including one or more attachment surfaces; and
    a second section coupled to the first section at the one or more attachment surfaces, wherein the first section is disposed between the second section and the rigid plate, and the first and second section together define a housing of the acoustic enclosure that includes at least one cavity configured to accommodate a portion of the speaker,
    wherein the first section comprises an expanded resin that is over-molded on the rigid plate.

2. The acoustic enclosure of claim 1, wherein the second section is constructed of expanded resin.

3. The acoustic enclosure of claim 2, wherein the expanded resin comprises expanded polystyrene foam.

4. The acoustic enclosure of claim 1, wherein the rigid plate is welded or fastened to frame.

5. The acoustic enclosure of claim 1, wherein rigid plate is constructed from metal or injection-molded plastic.

6. The acoustic enclosure of claim 1, wherein the second section is mechanically attached to the first section.

7. The acoustic enclosure of claim 1, wherein the second section is welded to the first section.

8. The acoustic enclosure of claim 1, wherein the rigid plate includes one or more structural features for configuring a flexibility of the rigid plate.

9. The acoustic enclosure of claim 8, wherein the one or more structural features are created by removing a portion of the rigid plate to increase flexibility of the rigid plate.

10. The acoustic enclosure of claim 8, wherein the one or more structural features comprise a flange configured to provide additional stiffness to the rigid plate.

11. A seat headrest comprising:
    a frame configured to attach the headrest to a seat;
    an acoustic enclosure for a speaker, the acoustic enclosure comprising:
        a rigid plate attached to the frame, the rigid plate configured to support a speaker disposed in part within the acoustic enclosure,
        a first section including one or more attachment surfaces, and
        a second section coupled to the first section at the one or more attachment surfaces, wherein the first and second section together define a housing of the acoustic enclosure that includes at least one cavity configured to accommodate a portion of the speaker; and
    a rigid supporting structure disposed in contact with the rigid plate,
    wherein the first section is disposed between the rigid plate and the second section, and comprises an expanded resin that is over-molded on the rigid plate.

12. The seat headrest of claim 11, further comprising a covering layer disposed over an external surface of the rigid supporting structure.

13. The seat headrest of claim 12, wherein the covering layer comprises at least one of: soft foam, fabric, leather, suede, or artificial leather.

14. The seat headrest of claim 11, wherein the second section is constructed of a material comprising expanded resin.

15. The seat headrest of claim 14, wherein the expanded resin comprises expanded polystyrene foam.

16. The seat headrest of claim 11, wherein the rigid plate is welded to frame.

17. The seat headrest of claim 11, wherein the rigid supporting structure includes an acoustic channel that facilitates acoustic energy to be radiated out of the acoustic enclosure.

18. The seat headrest of claim 11, wherein the rigid supporting structure is constructed of expanded resin.

19. The seat headrest of claim 11, wherein the first section and the rigid supporting structure are disposed on opposite sides of at least a portion of the rigid plate.

20. The seat headrest of claim 11, wherein the rigid plate includes one or more structural features for configuring a flexibility of the rigid plate.

21. The seat headrest of claim 20, wherein the one or more structural features are created by removing a portion of the rigid plate to increase flexibility of the rigid plate.

22. The seat headrest of claim 21, wherein the one or more structural features comprise a flange configured to provide additional stiffness to the rigid plate.

23. A method of constructing an acoustic enclosure for a speaker system disposed in a portion of a vehicle seat, the method comprising:
producing a first section of the acoustic enclosure by molding expanded resin over a rigid plate, the first section including one or more attachment surfaces;
producing a second section of the acoustic enclosure; and
coupling the second section to the first section at the one or more attachment surfaces such that the first section is disposed between the rigid plate and the second section, and the first section and the second section together form at least one cavity of the acoustic enclosure, the at least one cavity configured to accept at least a portion of the speaker system.

24. The method of claim 23, wherein the second section is produced by molding expanded resin.

25. The method of claim 23, wherein the second section is produced by molding a plastic.

26. The method of claim 23, further comprising attaching the rigid plate to a rigid frame associated with the acoustic enclosure.

27. The method of claim 23, wherein the expanded resin is molded over the rigid plate such that the rigid plate is enclosed in part by the expanded resin.

28. The method of claim 23, wherein the second section comprises one or more surfaces that are configured to be attached to one or more corresponding surfaces of the first section, and wherein coupling the second section to the first section comprises attaching the one or more surfaces of the second section to the one or more corresponding surfaces of the first section.

29. The method of claim 23, further comprising modifying the rigid plate to configure a flexibility of the rigid plate.

30. The method of claim 29, wherein modifying the rigid plate comprises removing a portion of the rigid plate to increase the flexibility.

* * * * *